United States Patent
Benveniste

(10) Patent No.: US 7,154,876 B2
(45) Date of Patent: Dec. 26, 2006

(54) EXPLORATORY POLLING FOR PERIODIC TRAFFIC SOURCES

(75) Inventor: Mathilde Benveniste, South Orange, NJ (US)

(73) Assignee: Avaya Technology, Inc., Basking Ridge, NJ (US)

( * ) Notice: Subject to any disclaimer, the term of this patent is extended or adjusted under 35 U.S.C. 154(b) by 216 days.

(21) Appl. No.: 10/674,178

(22) Filed: Sep. 29, 2003

(65) Prior Publication Data

US 2004/0131039 A1 Jul. 8, 2004

Related U.S. Application Data

(60) Provisional application No. 60/433,604, filed on Dec. 16, 2002.

(51) Int. Cl.
H04L 1/16 (2006.01)
(52) U.S. Cl. ........................ 370/342; 370/346
(58) Field of Classification Search ................ 370/346, 370/348, 231–235, 236.1–236.2, 395.4, 395.43
See application file for complete search history.

(56) References Cited

U.S. PATENT DOCUMENTS

| | | | | |
|---|---|---|---|---|
| 4,104,512 A | * | 8/1978 | Strayer | ...... 701/120 |
| 4,750,171 A | * | 6/1988 | Kedar et al. | ...... 370/445 |
| 5,737,330 A | * | 4/1998 | Fulthorp et al. | ...... 370/346 |
| 5,844,906 A | | 12/1998 | Khelghatti | |
| 6,567,416 B1 | | 5/2003 | Chuah | |
| 6,584,089 B1 | | 6/2003 | Honkasalo | |
| 2002/0024929 A1 | * | 2/2002 | Brueckner et al. | ...... 370/222 |
| 2003/0198244 A1 | * | 10/2003 | Ho et al. | ...... 370/442 |

\* cited by examiner

Primary Examiner—Hassan Kizou
Assistant Examiner—Salman Ahmed
(74) Attorney, Agent, or Firm—Chapin IP Law, LLC; David W. Rouille, Esq.; Barry W. Chapin, Esq.

(57) ABSTRACT

An apparatus and method for polling stations that transmit periodic traffic streams are disclosed. A station transmits a polling request that specifies the temporal period of the station's traffic stream, and a coordinator, after receiving the polling request, repeatedly sends polls to the station in a rapid-fire manner until a response from the station is received. The coordinator estimates the temporal offset for the temporal period based on one or both of (i) the time at which the coordinator received the response, and (ii) the time at which the coordinator transmitted the particular poll to which the station responded. Based on the temporal period and temporal offset, the coordinator establishes a polling schedule that polls the station soon after the station generates a frame. The coordinator also monitors downlink traffic to polled stations and, when the downlink traffic is periodic, establishes a downlink transmission schedule accordingly.

15 Claims, 9 Drawing Sheets

EXPLORATORY POLLING FOR PERIODIC TRAFFIC SOURCES

REFERENCE TO RELATED APPLICATIONS

This application claims the benefit of U.S. provisional patent application Ser. No. 60/433,604, filed 16 Dec. 2002, entitled "Poll Scheduling and Power Saving," which is also incorporated by reference.

FIELD OF THE INVENTION

The present invention relates to telecommunications in general, and, more particularly, to polling on local area networks.

BACKGROUND OF THE INVENTION

FIG. 1 depicts a schematic diagram of an exemplary wireless local-area network (LAN) 100 in the prior art comprising access point 101, stations 102-1 through 102-N, wherein N is a positive integer, and hosts 103-1 through 103-N, interconnected as shown. Each station 102-i, wherein $i \in \{1, 2, \ldots, N\}$, enables respective host 103-i (a device such as a notebook computer, personal digital assistant [PDA], tablet PC, etc.) to communicate wirelessly with other hosts in local-area network 100 via access point 101.

Access point 101 and stations 102-1 through 102-N transmit blocks of data called frames. A frame typically comprises a data portion, referred to as a data payload, and a control portion, referred to as a header. Frames transmitted from a station 102-i to access point 101 are referred to as uplink frames, and frames transmitted from access point 101 to a station 102-i are referred to as downlink frames. A series of frames transmitted from a station 102-i to access point 101 is referred to as an uplink traffic stream, and a series of frames transmitted from access point 101 to a station 102-i is referred to as a downlink traffic stream.

Access point 101 and stations 102-1 through 102-N transmit frames over a shared-communications channel such that if two or more stations (or an access point and a station) transmit frames simultaneously, then one or more of the frames can become corrupted (resulting in a collision). Consequently, local-area networks typically employ protocols for ensuring that a station or access point can gain exclusive access to the shared-communications channel for an interval of time in order to transmit one or more frames.

Such protocols can be classified into two types: contention-based protocols, and contention-free protocols. In a contention-based protocol, stations 102-1 through 102-N and access point 101 compete to gain exclusive access to the shared-communications channel, just as, for example, several children might fight to grab a telephone to make a call.

In a contention-free protocol, in contrast, a coordinator (e.g., access point 101, etc.) grants access to the shared-communications channel to one station at a time. An analogy for contention-free protocols is a parent (i.e., the coordinator) granting each of several children a limited amount of time on the telephone to talk, one at a time. One technique in which a coordinator can grant access to the shared-communications channel is polling. In protocols that employ polling, stations submit a polling request (also referred to as a reservation request) to the coordinator, and the coordinator grants stations exclusive access to the shared-communications channel sequentially in accordance with a polling schedule. A polling schedule has a temporal period (e.g., 5 seconds, etc.) and continually loops back to the beginning of the schedule after its completion. Since stations transmit only in response to a poll from the coordinator, polling-based protocols can provide contention-free access to the shared-communications channel.

SUMMARY OF THE INVENTION

The present invention enables a station that queues a frame for transmission on a periodic basis to be polled without some of the costs and disadvantages for doing so in the prior art. In particular, the illustrative embodiment establishes a polling schedule that reduces the delay between (i) when the station queues a frame, and (ii) when the station transmits the frame. This reduces the waiting time of the frame in the station, and is, therefore, especially advantageous for latency-sensitive applications such as voice and video telecommunications.

In accordance with the illustrative embodiment, a station that expects to periodically queue a frame for transmission sends a polling request to the polling coordinator that includes a temporal period (e.g., 100 milliseconds, etc.) specifying the periodicity of when the station expects to queue a frame. The polling coordinator then repeatedly sends polls to the station in a rapid-fire manner until a response from the station is received. After receiving a response, the coordinator estimates the temporal offset (i.e., phase) for the temporal period with respect to a particular reference (e.g., a beacon, etc.) based on at least one of: (i) the time at which the coordinator received the response, and (ii) the time at which the coordinator transmitted the particular poll to which the station responded. After estimating the temporal offset, the coordinator establishes, based on the temporal period and temporal offset, an advantageous polling schedule that, as described above, reduces the delay between when the station queues a frame, and when the station transmits the frame.

When two or more stations request periodic polling, it is possible that two or more stations might queue respective frames for transmission at the same time. For example, when two stations have identical temporal periods and identical temporal offsets, then each frame of the first station's uplink traffic stream will be queued at the same time as each frame of the first station's uplink traffic stream. In addition, when two stations have different temporal periods, then some of the uplink frames of the first station will be queued at the same time as uplink frames of the second station, in accordance with the beat frequency, as is well-known in the art.

Since only one station can be polled at a time, however, the illustrative embodiment employs polling events in the polling schedule, where each polling event specifies a list of one or more stations to be polled. When uplink frames are queued simultaneously by two or more stations, the list for the associated polling event contains these stations, and the coordinator polls each station in the list in sequential order. After polling the stations, the coordinator rotates the list for the next polling event to ensure fairness in the order of polls (i.e., over time each of the stations of the polling event spends virtually the same amount of time in the first position of the list, the second position, etc.) When a station queues an uplink frame and no other station queues an uplink frame at the same time, then the list for the associated polling event contains the one station, and the polling event consists of a single poll.

In addition to establishing a polling schedule for uplink traffic (i.e., frames sent from a station to the access point), the coordinator also monitors downlink traffic to polled stations and determines whether the downlink traffic is periodic in nature (for example, responses to a station that transmits periodic traffic might be periodic.) If downlink traffic to the station is also periodic, then the coordinator establishes a transmission schedule for transmitting the traffic to the station as soon as possible after it is received by the coordinator. As in the case of uplink traffic, minimizing the delay between the transmission and receipt of downlink frames is especially advantageous for real-time communications.

The illustrative embodiment comprises: receiving a polling request that specifies a first temporal period for a plurality of expected future transmissions; transmitting a plurality of polls to the sender of the polling request; receiving a response to at least one of the plurality of polls; and estimating a first temporal offset for the first temporal period based on at least one of: when the response was received, and when at least one of the plurality of polls was transmitted.

DETAILED DESCRIPTION

Figure 1:
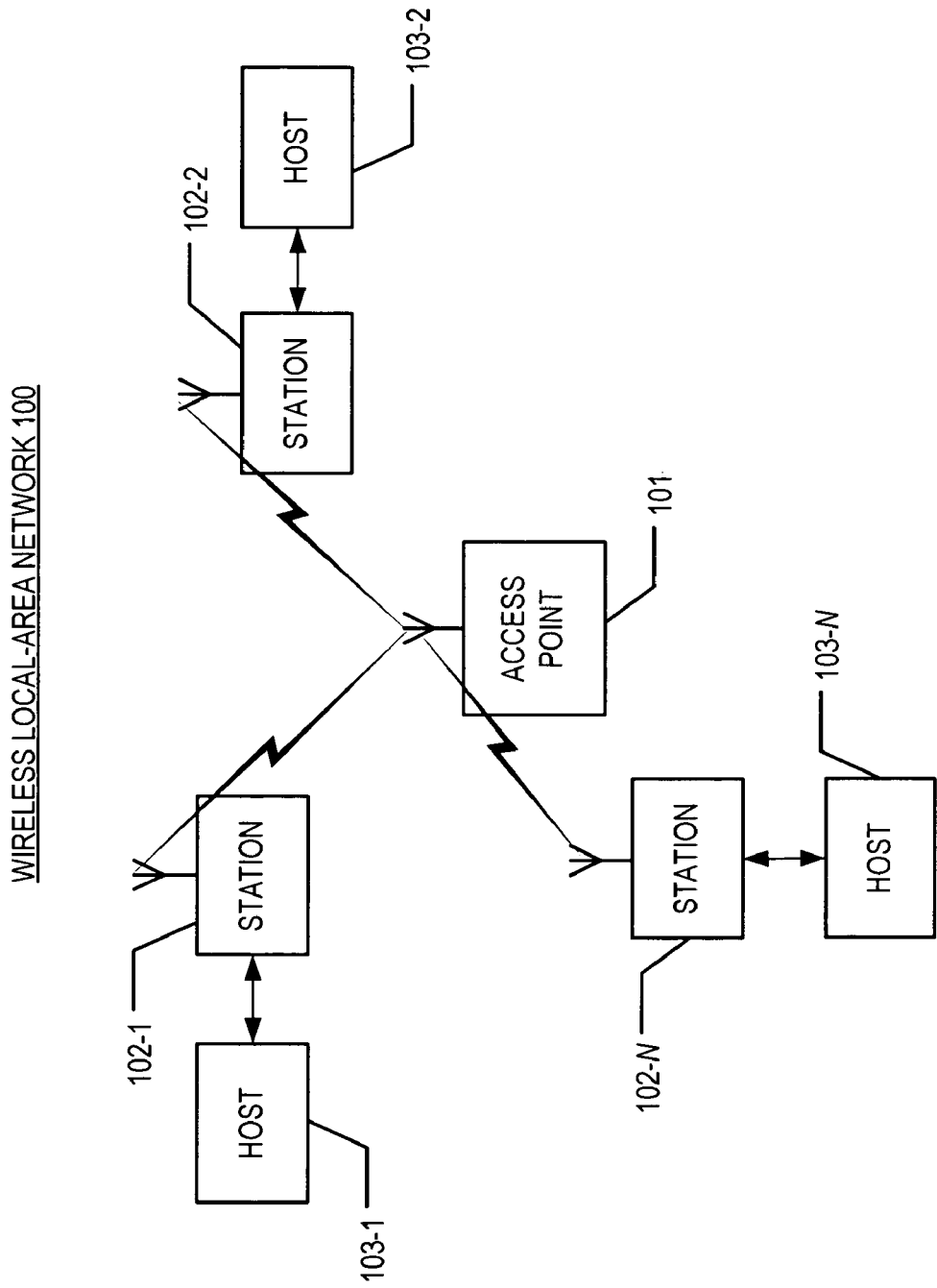
FIG. 1 depicts a schematic diagram of an exemplary wireless local-area network 100 in the prior art.
Figure 2:
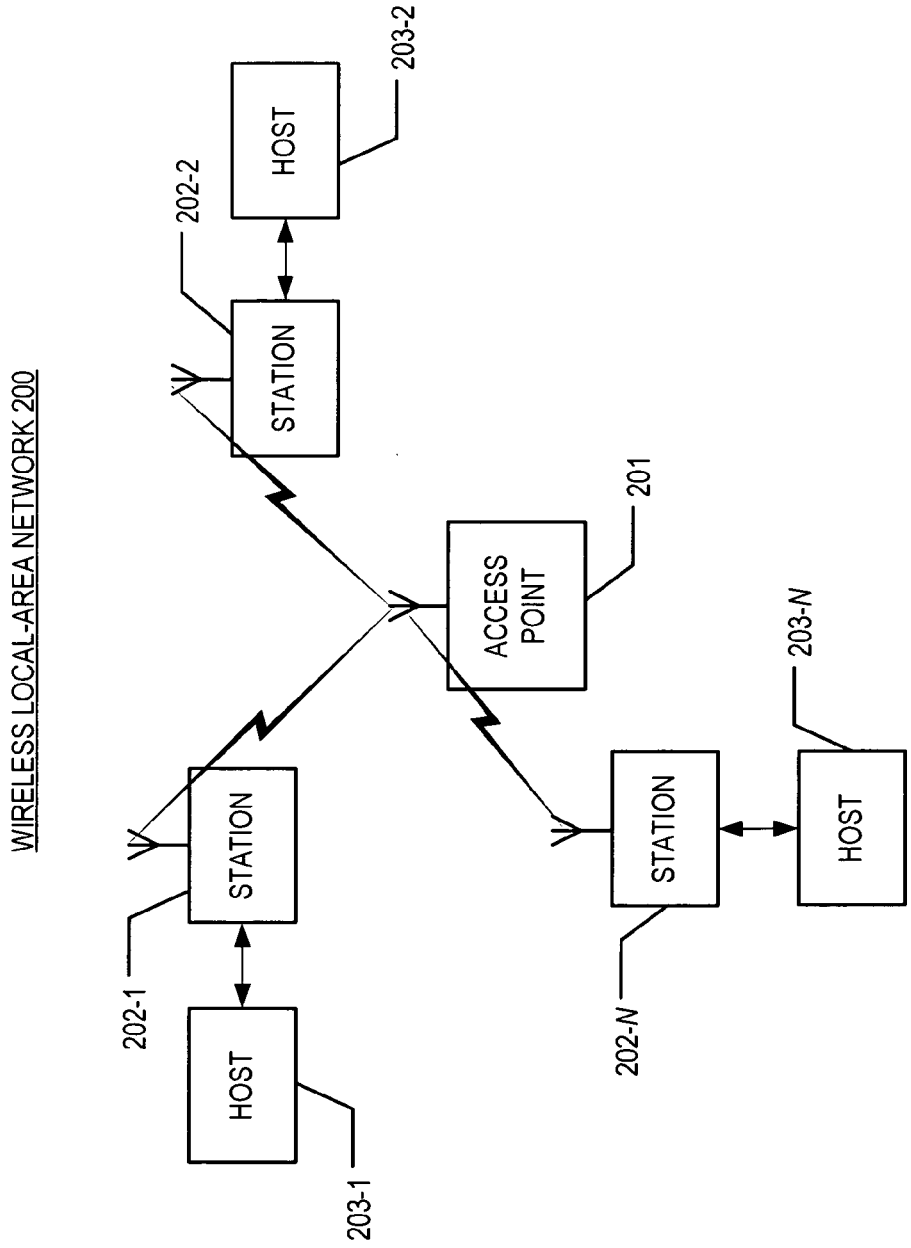
FIG. 2 depicts a schematic diagram of a portion of local-area network 200 in accordance with the illustrative embodiment of the present invention.

FIG. 2 depicts a schematic diagram of local-area network 200 in accordance with the illustrative embodiment of the present invention. Local-area network 200 comprises access point 201, stations 202-1 through 202-N, wherein N is a positive integer, and hosts 203-1 through 203-N, interconnected as shown.

As shown in FIG. 2, each station 202-i, wherein $i \in \{1, 2, \ldots, N\}$, is associated with a respective host 203-i, and enables host 203-i to communicate wirelessly with other hosts in local-area network 200 via access point 201.

Host 203-i is a device (e.g., notebook computer, personal digital assistants [PDA], tablet PCs, etc.) capable of generating data payloads and transmitting those data payloads to station 202-i. Host 203-i is also capable of receiving data payloads from station 202-i, and of processing and using the data contained within those data payloads.

Station 202-i is capable of receiving data payloads from host 203-i and of transmitting frames that comprise the data received from host 203-i over a shared-communications channel. Station 202-i is also capable of receiving frames from a shared-communications channel and sending data payloads comprising data from the frames to host 203-i.

Access point 201 (i) establishes a polling schedule, (ii) establishes a transmission schedule for periodic downlink traffic, (iii) polls stations 202-1 through 202-N in accordance with the polling schedule, and (iv) transmits periodic downlink traffic to stations 202-1 through 202-N in accordance with the transmission schedule, as described below and with respect to FIG. 6 through FIG. 9.

Architectures for access point 201 and station 202-i are described below and with respect to FIG. 3 and FIG. 4, respectively. It will be clear to those skilled in the art, after reading this specification, how to make and use access point 201 and station 202-i.

Figure 3:
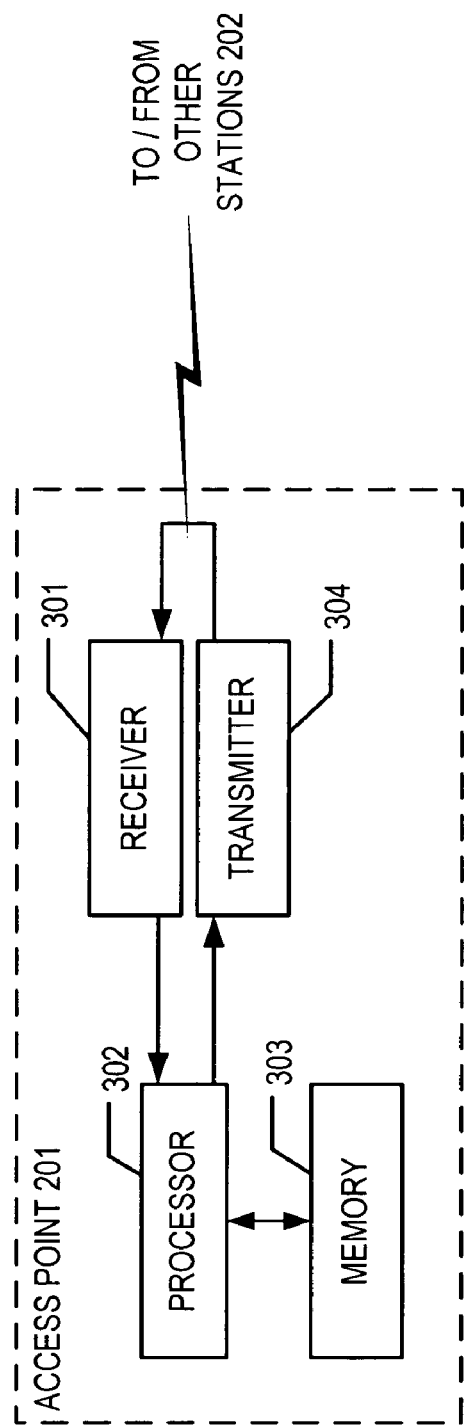
FIG. 3 depicts a block diagram of the salient components of access point 201, as shown in FIG. 2, in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving frames from shared-communications channel 203, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIG. 6 through FIG. 9. In some alternative embodiments of the present invention, processor 302 might be a special-purpose processor. In either case, it will be clear to those skilled in the art how to make and use processor 302.

Memory 303 is capable of storing programs and data used by processor 302, as is well-known in the art, and might be any combination of random-access memory (RAM), flash memory, disk drive, etc. It will be clear to those skilled in the art how to make and use memory 303.

Transmitter 304 is a circuit that is capable of receiving frames from processor 302, in well-known fashion, and of transmitting them on shared-communications channel 203. It will be clear to those skilled in the art how to make and use transmitter 304.

Figure 4:
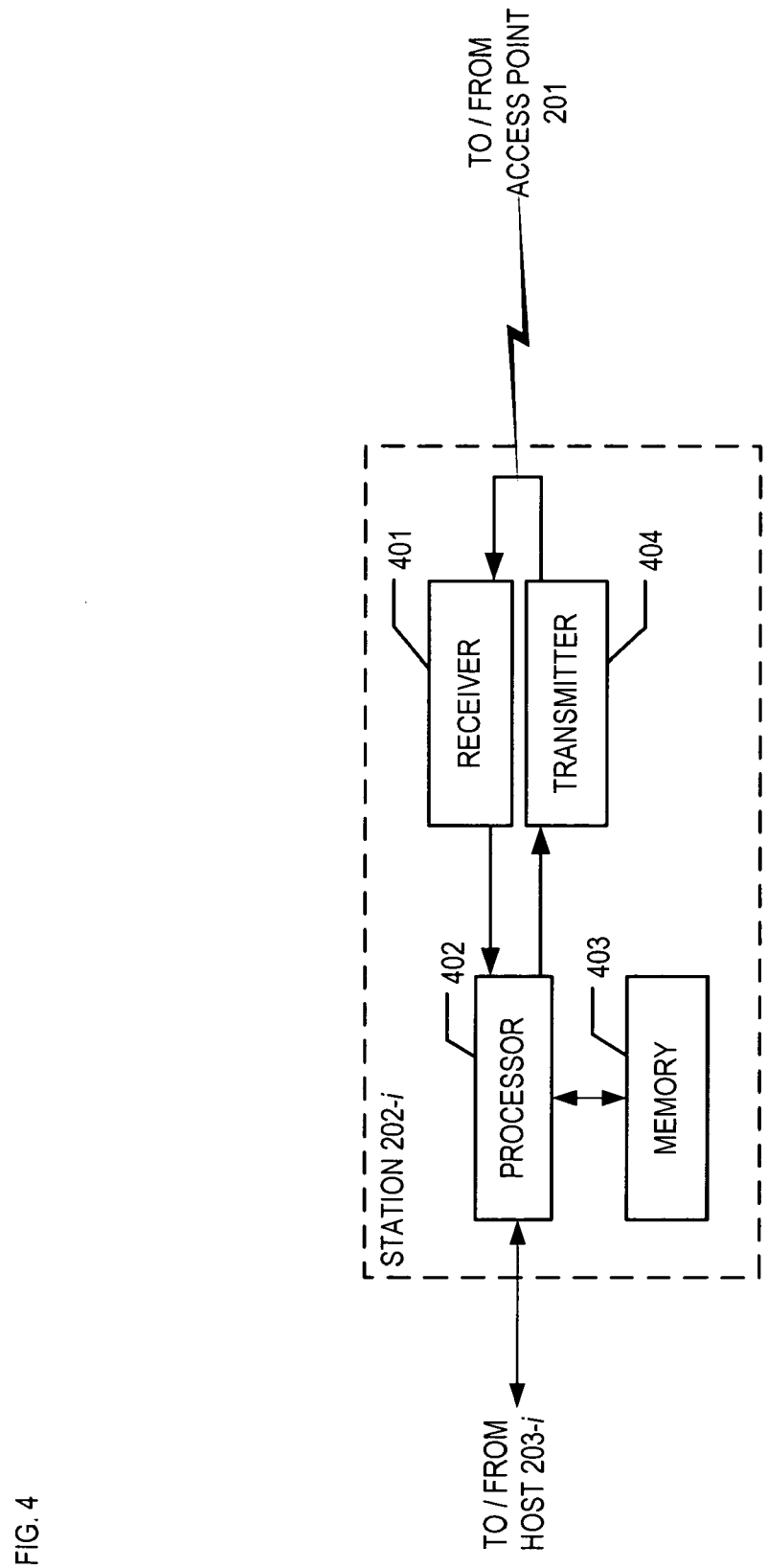
FIG. 4 depicts a block diagram of the salient components of station 202-i, as shown in FIG. 2, in accordance with the illustrative embodiment of the present invention.

FIG. 4 depicts a block diagram of the salient components of station 202-i, wherein $i \in \{1, 2, \ldots, N\}$, in accordance with the illustrative embodiment of the present invention. Station 202-i comprises receiver 401, processor 402, memory 403, and transmitter 404, interconnected as shown.

Receiver 401 is a circuit that is capable of receiving frames from shared-communications channel 203, in well-known fashion, and of forwarding them to processor 402. It will be clear to those skilled in the art how to make and use receiver 401.

Processor 402 is a general-purpose processor that is capable of executing instructions stored in memory 403, of reading data from and writing data into memory 403, and of executing the tasks described below and with respect to FIG. 5. In some alternative embodiments of the present invention, processor 402 might be a special-purpose processor. In either case, it will be clear to those skilled in the art, after reading this disclosure, how to make and use processor 402.

Memory 403 is capable of storing programs and data used by processor 402, as is well-known in the art, and might be any combination of random-access memory (RAM), flash memory, disk drive, etc. It will be clear to those skilled in the art how to make and use memory 403.

Transmitter 404 is a circuit that is capable of receiving frames from processor 402, in well-known fashion, and of transmitting them on shared-communications channel 203. It will be clear to those skilled in the art how to make and use transmitter 404.

Figure 5:
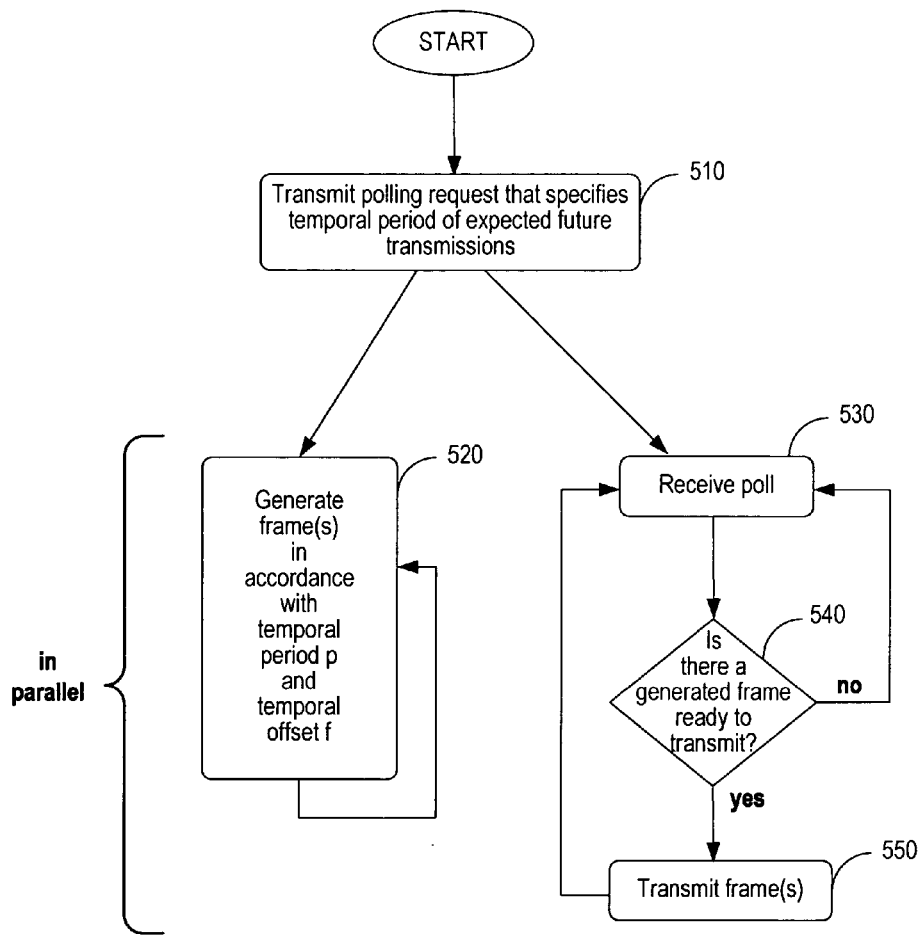
FIG. 5 depicts an event loop of the salient tasks performed by a station 202-i that transmits periodic traffic, in accordance with the illustrative embodiment of the present invention.

FIG. 5 depicts an event loop of the salient tasks performed by a station 202-i that transmits periodic traffic, wherein i∈{1, 2, . . . , N}, in accordance with the illustrative embodiment of the present invention.

At task 510, station 202-i transmits a polling request that specifies the temporal period π of expected future transmissions (e.g., 100 milliseconds, 3 seconds, etc.).

After completion of task 510, two event loops are executed in parallel: the first event loop comprises task 520, and the second event loop comprises tasks 530, 540, and 550.

At task 520, station 202-i continually generates, in well-known fashion, one or more frames in accordance with its temporal period π and a temporal offset φ.

At task 530, station 202-i receives a poll from access point 201 in well-known fashion.

At task 540, station 202-i checks whether station 202-i has already generated a frame that is ready for transmission. If so, execution proceeds to task 550, otherwise, execution continues back at task 530.

At task 550, station 202-i transmits the available frame(s) generated by task 520 in accordance with the appropriate protocol (e.g., an Institute of Electrical and Electronics Engineers [IEEE] 802.11 protocol, etc.). After task 550 has been completed, execution continues back at task 530.

Figure 6:
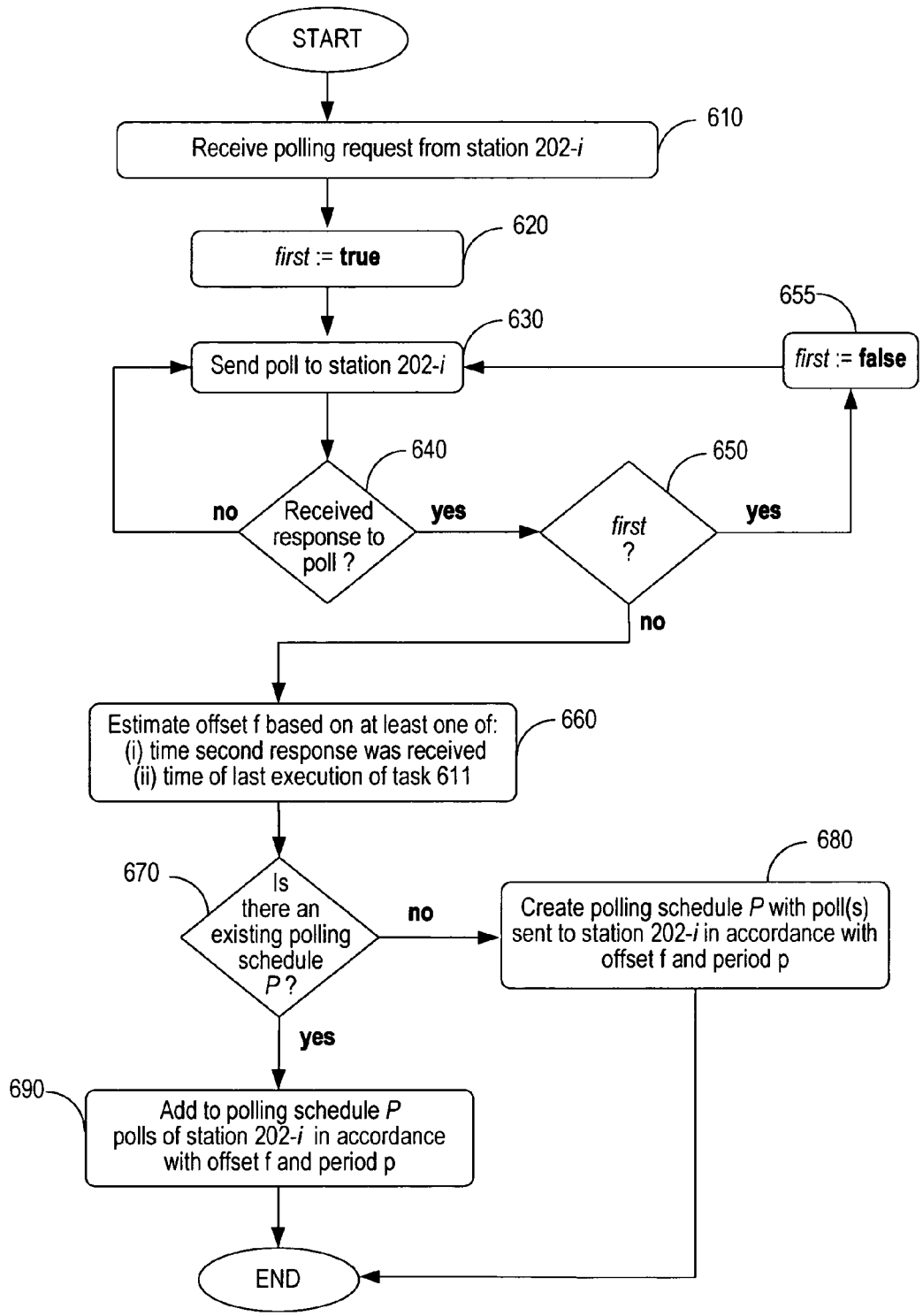
FIG. 6 depicts a flowchart of the salient tasks performed by access point 201, as shown in FIG. 2, in establishing a polling schedule, in accordance with the illustrative embodiment of the present invention.

FIG. 6 depicts a flowchart of the salient tasks performed by access point 201 in establishing a polling schedule, in accordance with the illustrative embodiment of the present invention.

At task 610, access point 201 receives a polling request from station 202-i that specifies a temporal period π, wherein i∈{1, 2, . . . , N}.

At task 620, access point 201 sets flag first to true.

At task 630, access point 201 sends a poll to station 202-i in well-known fashion.

At task 640, access point 201 checks whether access point 201 has received from station 202-i a response to the poll sent at task 630. If so, execution proceeds to task 650, otherwise execution continues back at task 640.

At task 650, access point 201 checks whether flag first equals true; if so, execution proceeds to task 655, otherwise execution proceeds to task 660.

At task 655, access point 201 sets flag first to false, and execution continues back at task 630.

Flag first is thus employed so that estimating the temporal offset for station 202-i's periodic traffic stream (performed at task 660, described below) is based on station 202-i's second response to the rapid-fire polling. The reason for using the second response rather than the first response is that there might be a significant time delay between (i) station 202-i's queueing a frame for transmission, and (ii) access point 201's first poll to station 202-i after receiving station 202-i's polling request. (This might be due, for example, to the time required for 202-i to gain contention-based access to the shared-communications channel in order to transmit the poll.) The time at which the first response is received, therefore, might not be deterministically related to the time at which the frame in the first response was queued for transmission, and thus it is an unreliable measure for estimating temporal offset φ. (Note that when the time delay exceeds temporal period π, the first response might actually comprise more than one frame.) The second response, however, provides a good basis upon which to estimate temporal offset (as described in task 660 below), since access point 201 sends polls to station 202-i in rapid succession at task loop 630–655.

At task 660, access point 201 estimates temporal offset based on an estimate of the time at which station 202-i generated the frame of the second response. Access point 201 estimates when station 202-i generated the frame of the second response based on at least one of: (i) the time $t_1$ at which the second response was received, and (ii) the time $t_2$ at which access point 201 transmitted the particular poll to which the station responded. In some embodiments, the time at which the frame of the second response was generated might be estimated as $t_1$ minus a transmission delay for the response. In some other embodiments, the time at which the frame of the second response was generated might be estimated as $t_2$, the time at which access point 201 transmitted the poll to which 202-i responded. In still some other embodiments, an estimate might be made based on a combination of (i) and (ii) (e.g., an average of $t_1$ and $t_2$, etc.).

At task 670, access point 201 checks whether a polling schedule P already exists. If so, execution proceeds to task 680, otherwise execution proceeds to task 690.

At task 680, access point 201 creates a new polling schedule P with one or more polls sent to station 202-i in accordance with temporal period π and estimated temporal offset φ. Polling schedule P repeats continually, and thus in some embodiments it is particularly convenient to set the duration of schedule P to a value divisible by period π. After completion of task 680, execution of the method of FIG. 6 terminates.

At task 690, access point 201 adds one or more polls of station 202-i to polling schedule P in accordance with temporal period π and estimated temporal offset φ. In accordance with the illustrative embodiment, task 690 comprises, if necessary, adjusting the temporal period of schedule P accordingly. For example, if a poll that occurs every 6 seconds is to be added to a polling schedule that has a temporal period of 4, then the new polling schedule should have a temporal period of 12, comprising (i) three successive instances of the previous polling schedule, and (ii) two instances of the added poll.

Formally, if polling schedule P previously included polls to a set of stations S and previously had a temporal period Q, then the temporal period of the new polling schedule P should be increased, if necessary, to a value Q' such that for all stations 202-i∈S, Q' is divisible by $\pi_i$, where $\pi_i$ is the temporal period of station 202-i. (In other words, Q' is the least common multiple of the temporal periods of every station in polling schedule P.)

As another example, when:
the previous polling schedule P has
  (i) a temporal period of 6.0 seconds, and
  (ii) a single poll to station 202-j at time 5.0 (i.e., $\pi_y=6.0$ and $\phi_y=5.0$), wherein j is a positive integer such that $j \leq N$;

and station 202-i ($i \neq j$), which has temporal period $\pi_i=4.0$ and offset $\phi_i=2.0$, is added to polling schedule P;

then the new polling schedule will have
  (i) a temporal period of 12.0 seconds,
  (ii) polls to station 202-j at times 5.0 and 11.0, and
  (iii) polls of station 202-i at times 2.0, 6.0, and 10.0.

As will be appreciated by those skilled in the art, the above method of constructing a polling schedule might result in simultaneous polls of two or more stations. As described above, since only one station can be polled at a time, the illustrative embodiment employs polling events in the polling schedule, where each polling event specifies a list of one or more stations to be polled. A description of how the illustrative embodiment processes the lists associated with polling events is disclosed below and with respect to FIG. 7 through FIG. 9.

After completion of task 690, execution of the method of FIG. 6 terminates.

Figure 7:
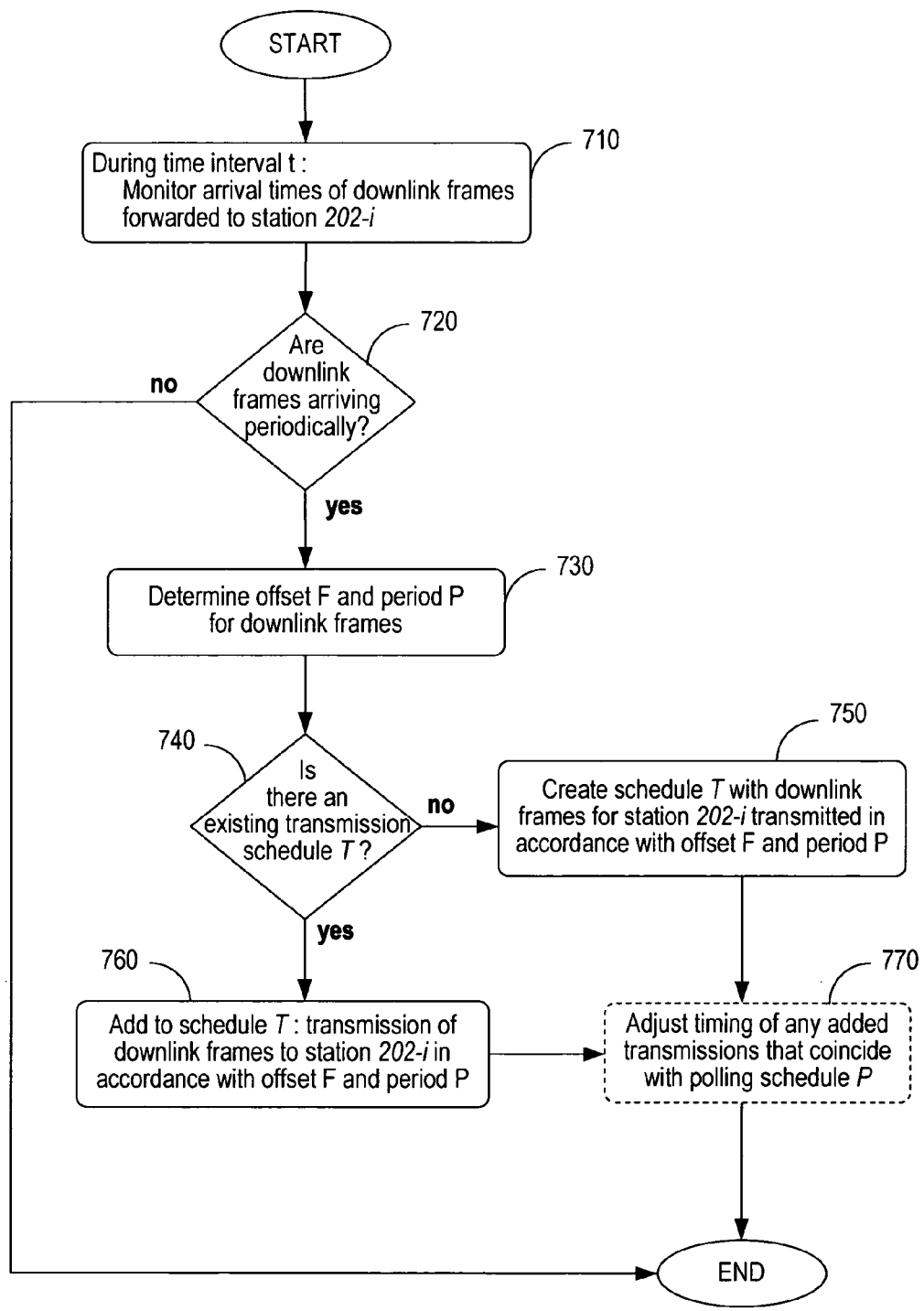
FIG. 7 depicts a flowchart of the salient tasks performed by access point 201, as shown in FIG. 2, in establishing a downlink transmission schedule, in accordance with the illustrative embodiment of the present invention.

FIG. 7 depicts a flowchart of the salient tasks performed by access point 201 in establishing a transmission schedule, in accordance with the illustrative embodiment of the present invention. The transmission schedule specifies when access point 201 transmits buffered downlink traffic to stations 202-i in wireless local-area network 200, wherein $i \in \{1, 2, \ldots, N\}$.

At task 710, access point 201 monitors the arrival times of downlink frames received by access point 201 and transmitted from access point 201 to station 202-i. The monitoring of task 710 occurs during a time interval $\tau$ that is sufficiently long to serve as an observation period for characterizing downlink traffic to station 202-i. It will be clear to those skilled in the art how to choose a suitable value for $\tau$.

At task 720, access point 201 determines, in well-known fashion, whether downlink frames for station 202-i arrive in accordance with a regular temporal period, based on the observation period of task 710. If the determination is affirmative, execution proceeds to task 730, otherwise, the method of FIG. 7 terminates.

At task 730, access point 201 determines the temporal period $\Pi$ and temporal offset $\Phi$ of downlink frames for station 202-i, where offset $\Phi$ is relative to the 802.11 beacon transmitted by access point 201. It is well-known in the art how to determine the period and offset (i.e., "phase") of a periodic traffic stream.

At task 740, access point 201 checks whether a transmission schedule T already exists. If none exists, execution proceeds to task 750, otherwise execution continues at task 760.

At task 750, a new transmission schedule T is created with downlink frames for station 202-s transmitted in accordance with temporal offset $\Phi$ and temporal period $\Pi$.

At task 760, existing transmission schedule T is augmented with the transmission of downlink frames to station 202-i in accordance with temporal offset $\Phi$ and temporal period $\Pi$. As will be appreciated by those skilled in the art, it is possible that a downlink transmission to station 202-i occurs at the same time as another downlink transmission already in schedule T. Consequently, the illustrative embodiment maintains a list of one or more stations at each transmission event that indicates to which station(s) downlink frames should be transmitted. As is the case for polling schedule P, downlink frames are transmitted sequentially to the stations in the list, beginning at the time specified in transmission schedule T. The illustrative embodiment employs a mechanism disclosed below in the description of FIG. 9 for ensuring "fairness" with respect to the order in which downlink frames are transmitted to stations in a list.

At optional task 770, any collisions between the new transmission schedule T and polling schedule P (i.e., a transmission in schedule T and a poll in schedule P that occur simultaneously) are overcome by suitably adjusting (i.e., via a slight time shift) the appropriate newly-added transmission of schedule T. In some embodiments, one or more tasks or methods might be performed in lieu of task 770 for avoiding collisions between schedules P and T. (For example, the illustrative embodiment employs (i) the method of FIG. 8, disclosed below, for combining polling schedule P and transmission schedule T into a composite schedule, and (ii) the event loop mechanism of FIG. 9, disclosed below, for rotating between simultaneous polls and transmissions in round-robin fashion, in lieu of task 770.

Figure 8:
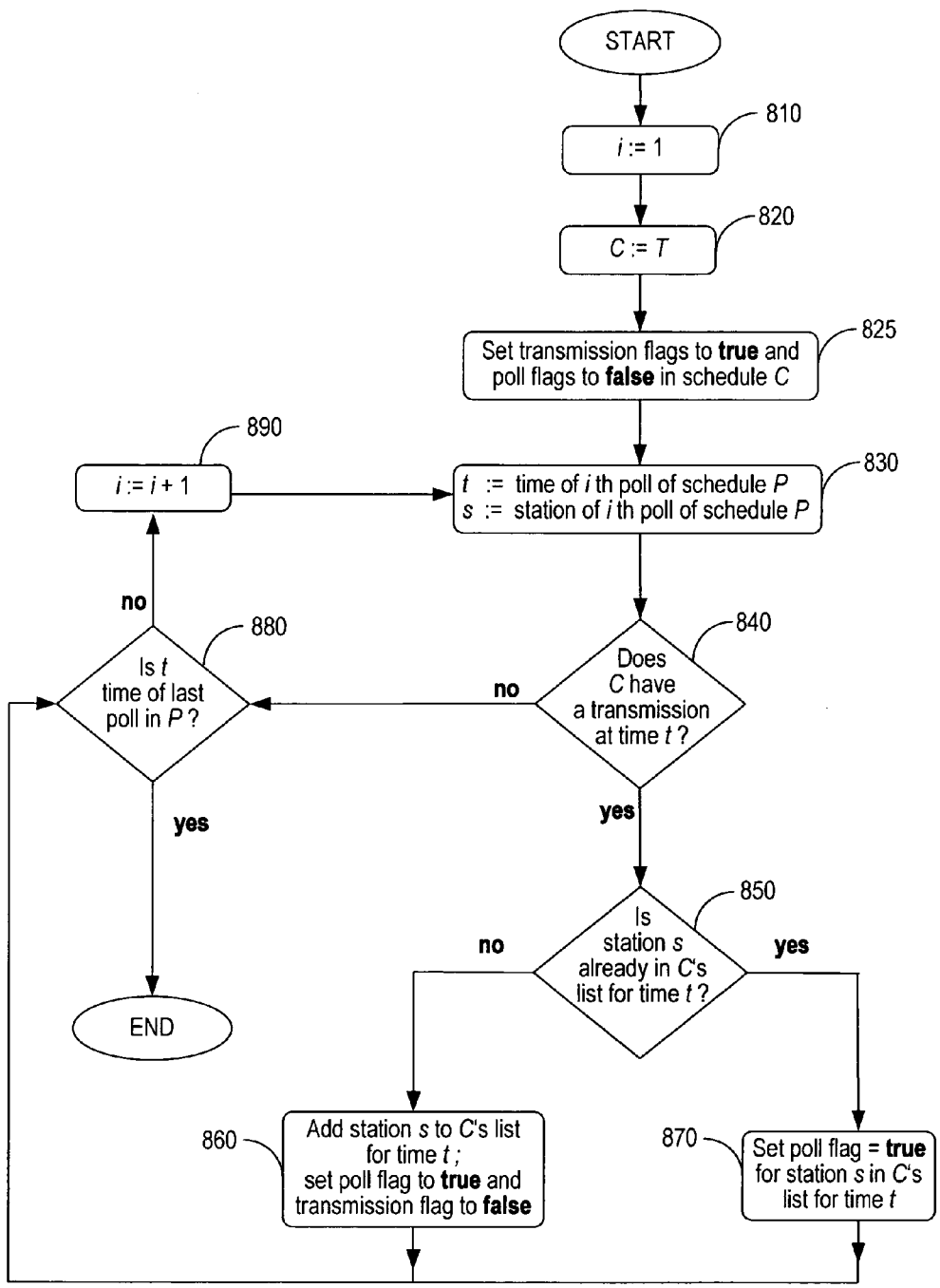
FIG. 8 depicts a flowchart of the salient tasks performed by access point 201, as shown in FIG. 2, in combining a polling schedule and a transmission schedule into a composite schedule, in accordance with the illustrative embodiment of the present invention.

FIG. 8 depicts a flowchart of the salient tasks performed by access point 201 in combining a polling schedule and a transmission schedule into a composite schedule, in accordance with the illustrative embodiment of the present invention.

At task 810, index variable i is initialized to 1.

At task 820, variable C, which is used to store the composite schedule, is initialized to transmission schedule T.

At task 825, for each combination of station and time in composite schedule C, an associated transmission flag is set to true, and an associated poll flag is set to false. In the illustrative embodiment, the transmission and poll flags are stored in composite schedule C; however, it will be clear to those skilled in the art that in some other embodiments these flags might be stored in a separate data structure.

At task 830, variable t is set to the time of the $i^{th}$ poll of polling schedule P, and variable s is set to the station polled in the $i^{th}$ poll of polling schedule P.

At task 840, access point 201 checks whether composite schedule C has a transmission at time t (obtained from transmission schedule T at task 820). If so, execution proceeds to task 850, otherwise execution continues at task 880.

At task 850, access point 201 checks whether station s is already in the list of stations at time t in composite schedule C. If so, execution proceeds to task 870, otherwise, execution proceeds to task 860.

At task 860, station s is added to the list of stations at time t in composite schedule C. The associated poll flag for station s at time t is set to true, and the associated transmission flag is set to false. After the completion of task 860, execution continues at task 880.

At task 870, the associated poll flag for station s at time t is set to true. After the completion of task 870, execution continues at task 880.

At task 880, access point 201 checks whether the poll at time t is the last poll in polling schedule P. If so, execution continues at task 890, otherwise the method of FIG. 8 terminates.

At task 890, index variable i is incremented by 1. After the completion of task 890, execution continues back at task 830.

Figure 9:
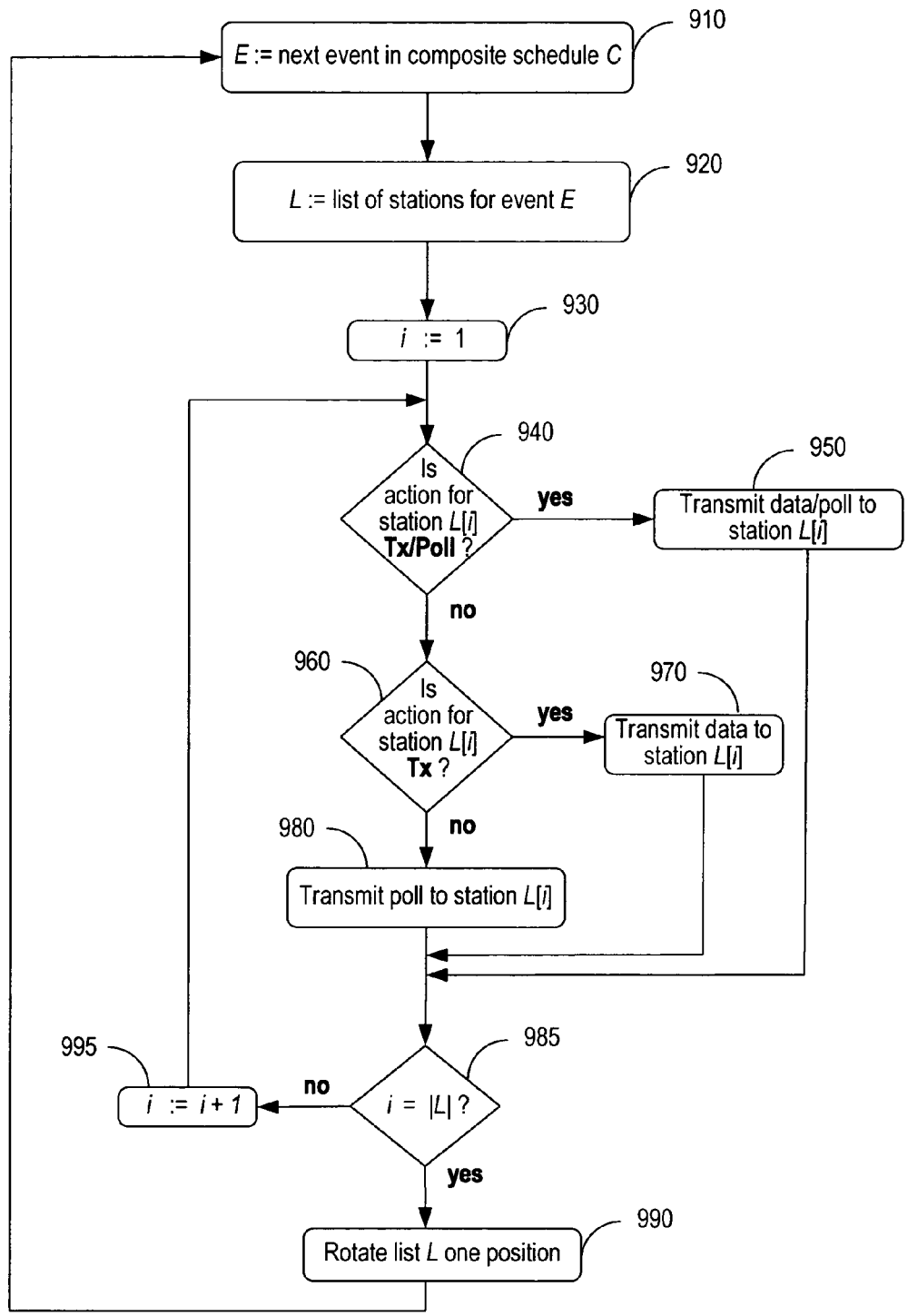
FIG. 9 depicts an event loop for access point 201, as shown in FIG. 2, for processing a composite schedule, in accordance with the illustrative embodiment of the present invention.

FIG. 9 depicts an infinite event loop for access point 201 for processing composite schedule C, in accordance with the illustrative embodiment of the present invention. When the event loop is first started, execution begins at task 910.

At task 910, variable E is set to the next event in composite schedule C. If the event loop has just been started, the next event is the first event of schedule C.

At task 920, variable L is set to the list of stations associated with event E.

At task 930, index variable i is initialized to 1.

At task 940, access point 201 checks whether the transmission and poll flags for the $i^{th}$ station in list L (i.e., L[i]) are both true, indicating that a combined transmission/poll is the appropriate action. If so, execution proceeds to task 950, otherwise execution continues at task 960.

At task 950, access point 201 transmits a downlink frame with a "piggybacked" poll to station L[i] in well-known fashion. After the completion of task 950, execution proceeds to task 985.

At task 960, access point 201 checks whether the transmission and poll flags for L[i] are true and false, respectively, indicating that a downlink transmission is the appropriate action. If so, execution proceeds to task 970, otherwise execution continues at task 980.

At task 970, access point 201 transmits a downlink frame to station L[i] in well-known fashion. After the completion of task 970, execution proceeds to task 985.

At task 980, access point 201 transmits a poll to station L[i] in well-known fashion. After the completion of task 980, execution proceeds to task 985.

At task 985, access point 201 checks whether variable i is equal to the size of list L, indicating that all stations in the list have been processed in accordance with tasks 940 through 980. If so, execution proceeds to task 990, otherwise execution proceeds to task 995.

At task 990, list L is rotated one position so that the first station in the list becomes the last, the second station in the list becomes the first, the third station becomes the second, etc. This establishes a new order for list L in preparation for processing event E in the next iteration of schedule C. After the completion of task 990, execution continues back at task 910 for the next invocation of the event loop.

At task 995, index variable i is incremented by 1. After the completion of task 995, execution continues back at task 940 for processing the next station in list L.

Although the illustrative embodiment of the present invention is disclosed in the context of local-area networks, it will be clear to those skilled in the art, after reading this specification, how to make and use embodiments of the present invention for other kinds of networks that employ a shared-communications channel.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   (a) receiving a polling request that specifies a first temporal period for a plurality of expected future transmissions;
   (b) transmitting a plurality of polls to the sender of said polling request;
   (c) receiving a response to at least one of said plurality of polls;
   (d) estimating a first temporal offset for said first temporal period based on at least one of:
      (i) when said response was received, and
      (ii) when at least one of said plurality of polls was transmitted; and
   (e) establishing a polling schedule based on said first temporal period and said first temporal offset wherein the temporal offset for the temporal period reduces a delay between when a station queues a frame and when a station transmits a frame;
   (f) receiving a plurality of frames for forwarding to said sender of said polling request;
   (g) determining whether the arrival times of said frames are in accordance with a second temporal offset and a second temporal period; and
   (h) establishing, when said arrival times are in accordance with said second temporal offset and said second temporal period, a transmission schedule for transmitting each of said frames to said sender of said polling request;
   wherein said transmission schedule is based on said second temporal offset and said second temporal period wherein said second response is used since said second response may not include a time required to gain contention based access to a shared communications channel while said first response may include a time required to gain contention based access to a shared communications channel.

2. The method of claim 1 further comprising
   (j) transmitting:
      (i) each of said frames to said sender of said polling request in accordance with said transmission schedule, and
      (ii) a poll to said sender of said polling request in accordance with said polling schedule.

3. The method of claim 1 further comprising (j) combining said polling schedule and said transmission schedule into a composite schedule, wherein the composite schedule avoids collisions between the polling schedule and the transmission schedule if said polling schedule and said transmission schedule were used alone.

4. The method of claim 3 wherein said combining said polling schedule and said transmission schedule into a composite schedule further comprises:
   determining whether any transmission events are scheduled that would collide with any polling events; and
   when a transmission event would collide with a polling event then scheduling said transmission event to a time which would not collide with a polling event.

5. The method of claim 1 wherein said transmitting and said receiving are via a shared-communications channel.

6. A method comprising:
   (a) receiving a polling request that specifies a first temporal period for a plurality of expected future transmissions;
   (b) transmitting a first poll to the sender of said polling request;
   (c) receiving a first response to said first poll;
   (d) transmitting a second poll to said sender of said polling request;
   (e) receiving a second response to said second poll;
   (f) estimating a first temporal offset for said first temporal period based on at least
      (i) when said second response was received, and
      (ii) when said second poll was transmitted; and
   (g) establishing a polling schedule based on said first temporal period and said first temporal offset wherein the temporal offset for the temporal period reduces a delay between when a station queues a frame and when a station transmits a frame;
(h) receiving a plurality of frames for forwarding to said sender of said polling request;
(i) determining whether the arrival times of said frames are in accordance with a second temporal offset and a second temporal period; and
(j) establishing, when said arrival times are in accordance with said second temporal offset and said second temporal period, a transmission schedule for transmitting each of said frames to said sender of said polling request wherein said second response is used since said second response may not include a time required to gain contention based access to a shared communications channel while said first response may include a time required to gain contention based access to a shared communications channel;
wherein said transmission schedule is based on said second temporal offset and said second temporal period.

7. The method of claim 6 further comprising
(k) transmitting:
   (i) each of said frames to said sender of said polling request in accordance with said transmission schedule, and
   (ii) a poll to said sender of said polling request in accordance with said polling schedule.

8. The method of claim 6 further comprising combining said polling schedule and said transmission schedule into a composite schedule wherein the composite schedule avoids collisions between the polling schedule and the transmission schedule if said polling schedule and said transmission schedule were used alone.

9. The method of claim 8 wherein said combining said polling schedule and said transmission schedule into a composite schedule further comprises:
   determining whether any transmission events are scheduled that would collide with any polling events; and
   when a transmission event would collide with a polling event then scheduling said transmission event to a time which would not collide with a polling event.

10. An apparatus comprising;
(a) a receiver for receiving a polling request that specifies a first temporal period for a plurality of expected future transmissions;
(b) a transmitter for transmitting a plurality of polls to the sender of said polling request;
(c) a processor for estimating a first temporal offset for said first temporal period based on at least one of:
   (i) when said response was received, and
   (ii) when at least one of said plurality of polls was transmitted; and
   wherein said processor is also for establishing a polling schedule based on said first temporal period and said first temporal offset wherein the temporal offset for the temporal period reduces a delay between when a station queues a frame and when a station transmits a frame;
wherein said receiver is also for receiving a plurality of frames for forwarding to said sender of said polling request; and wherein said processor is also for
   (iii) determining whether the arrival times of said frames are in accordance with a second temporal offset and a second temporal period, and
   (iv) establishing, when said arrival times are in accordance with said second temporal offset and said second temporal period, a transmission schedule based on said second temporal offset and said second temporal period for transmitting each of said frames to said sender of said polling request wherein said second response is used since said second response may not include a time required to gain contention based access to a shared communications channel while said first response may include a time required to gain contention based access to a shared communications channel.

11. The apparatus of claim 10 wherein said transmitter is also for transmitting
   (i) each of said frames to said sender of said polling request in accordance with said transmission schedule, and
   (ii) a poll to said sender of said polling request in accordance with said polling schedule.

12. The apparatus of claim 10 wherein said processor is also for combining said polling schedule and said transmission schedule into a composite schedule wherein the composite schedule avoids collisions between the polling schedule and the transmission schedule if said polling schedule and said transmission schedule were used alone.

13. The apparatus of claim 12 wherein said combining said polling schedule and said transmission schedule into a composite schedule further comprises:
   determining whether any transmission events are scheduled that would collide with any polling events; and
   when a transmission event would collide with a polling event then scheduling said transmission event to a time which would not collide with a polling event.

14. The apparatus of claim 10 wherein said transmitter transmits via a shared-communications channel, and wherein said receiver receives via said shared-communications channel.

15. An apparatus comprising:
(a) a transceiver for:
   (i) receiving a polling request that specifies a first temporal period for a plurality of expected future transmissions,
   (ii) transmitting a first poll to the sender of said polling request
   (iii) receiving a first response to said first poll,
   (iv) transmitting a second poll to said sender of said polling request, and
   (v) receiving a second response to said second poll;
(b) a processor for estimating a first temporal offset for said first temporal period based on at least one of:
   (i) when said second response was received, and
   (ii) when said second poll was transmitted wherein the temporal offset for the temporal period reduces a delay between when a station queues a frame and when a station transmits a frame; and
   wherein said processor is also for establishing a polling schedule based on said first temporal period and said first temporal offset wherein the temporal offset for the temporal period reduces a delay between when a station queues a frame and when a station transmits a frame;
wherein said receiver is also for receiving a plurality of frames for forwarding to said sender of said polling request; and wherein said processor is also for:

(iii) determining whether the arrival times of said frames are in accordance with a second temporal offset and a second temporal period, and (iv) establishing, when said arrival times are in accordance with said second temporal offset and said second temporal period, a transmission schedule for transmitting each of said frames to said sender of said polling request wherein said transmission schedule is based on said second temporal offset and said second temporal period.

* * * * *